Figure 1:
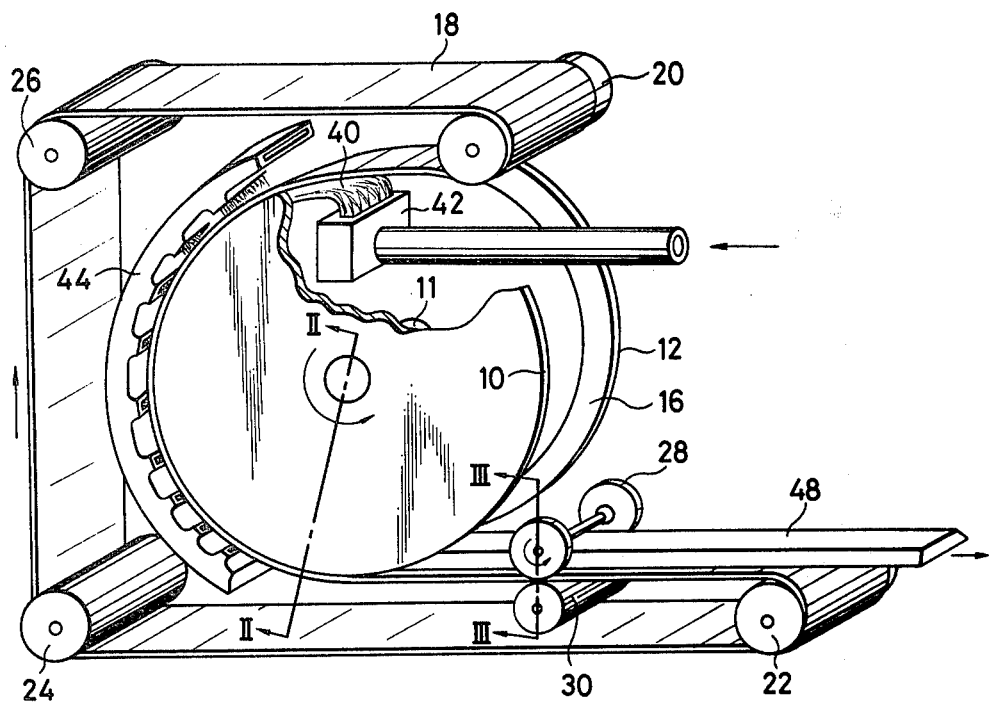

United States Patent [19]

Niiyama et al.

[11] 4,434,836
[45] Mar. 6, 1984

[54] CONTINUOUS CASTING APPARATUS

[75] Inventors: Eisuke Niiyama; Hideyo Kodama, both of Katsuta, Japan

[73] Assignee: Hitachi, Ltd., Tokyo, Japan

[21] Appl. No.: 267,916

[22] Filed: May 28, 1981

[30] Foreign Application Priority Data

Jun. 4, 1980 [JP] Japan .................................. 55-74347

[51] Int. Cl.³ ............................................ B22D 11/00
[52] U.S. Cl. ..................................... 164/429; 164/479
[58] Field of Search ............... 164/429, 433, 434, 479, 164/482, 488

[56] References Cited

U.S. PATENT DOCUMENTS 3,811,491  5/1974  Gerding ............................... 164/87
4,202,404  5/1980  Carlson ............................ 164/429 X

FOREIGN PATENT DOCUMENTS 55-147466  11/1980  Japan ................................. 164/433

Primary Examiner—Gus T. Hampilos
Assistant Examiner—Peter B. Martine
Attorney, Agent, or Firm—Thomas E. Beall, Jr.

[57] ABSTRACT

Semiannular mold space is defined by a pair of rotary wheels and an endless belt trained around circumferential surfaces of the wheels. Molten metal is injected into the mold space upwardly so that the molten metal is statically poured into the mold. The circumferential edges of the opposing surfaces of the wheels have inclined surfaces in such a manner that the width of the mold space becomes narrower in a direction toward the axis of the wheels. The molten metal is continuously solidified by the belt and the inclined surfaces and withdrawn horizontally from the mold space as a cast strip which remains unsolidified molten metal within the upper portion of the solid shell.

23 Claims, 8 Drawing Figures

CONTINUOUS CASTING APPARATUS

The present invention relates to a continuous casting apparatus of a type having a pair of casting wheels and an endless metallic belt, and more particularly to a continuous casting apparatus in which molten metal is charged into a casting mold defined between the casting wheel and the belt, molten metal being solidified and successively withdrawn to continuously form a cast metal strip.

Recently there is an increasing demand for producing cast metal strip continuously at a thickness reduced as much as possible to decrease the thickness reduction in the subsequent steps to enhance the productivity and decrease heat losses. The direct rolling or in-line rolling in which the casting and rolling steps are connected directly well meets the above described demand. Under these circumstances, it is required to form a thin cast strip continuously at a speed of 5 m/min. or higher. To this end, various rotary type continuous casting machines are proposed, which had no sliding movement between a molten metal and a mold. One of such a type continuous casting machine is described in U.S. Pat. No. 3,605,867, in which a cast strip is withdrawn from a pool of molten metal by a rotary mold defined by a pair of casting wheels and an endless metal belt trained around the wheels.

In this type of machine, the region of contact between the belt and the wheels, i.e., the width of the mold, can be considerably large so that the molten metal can be poured comparatively easily. This type of machine, therefore, is more suitable for a high speed continuous casting of a cast strip than the other type of machines. The rotary type continuous casting machine, however, has the following disadvantages. Namely, as the rotary mold is always dipped in the pool of molten metal, it is rather difficult to obtain a cast strip with a desired thickness and surface roughness. This is because the thickness of the strip changes not only with the changes of the rotational speed of the rotary mold but also with the changes of the depth of the pool and the temperature of the molten metal. Further, as the surface of the pool is always waving, it makes it difficult to obtain a flat surface of the cast strip. Also, this apparatus has no member for supporting the cast strip extracted from the rotary mold, so that the molten metal has to be solidified before it leaves the mold. If the molten metal is withdrawn while it contains unsolidified metal, the metal in molten state may spill out of the cast strip. Therefore, there is a practical limit in increasing the casting speed in accordance with the thickness of the cast strip. From the viewpoint of increase of casting speed, it is suggested to increase the diameter of the wheels to obtain as long a period of time in which the molten metal is subjected to cooling in the mold as possible. The increase of the diameter of the wheels, however, is practically limited because of a drastic increase of the installation cost.

Accordingly, an object of the present invention is to provide an imprved rotary type continuous casting machine, which is capable of producing a cast metal strip having a desired thickness and flatness at a high casting speed.

Another object of the present invention is to provide a further improved rotary type continuous casting machine which permits the extraction of the cast metal strip still containing unsolidified metal thereby to make it possible to increase the casting speed.

According to one feature of the present invention, semiannular mold space is defined by a pair of rotary wheels and an endless belt trained around circumferential surfaces of the wheels. Molten metal is injected by a nozzle upwardly toward the rotary mold from between a space of the wheels, thereby the molten metal injected is radially pressed against the bottom of the mold space by the centrifugal force and withdrawn from the mold after sufficiently cooled. The arrangement of the nozzle of the molten metal advantageously improves the accuracy of thickness and the flatness of the cast strip, because the molten metal can be statically placed on the rotating mold by injecting the molten metal substantially with no relative speed between the molten metal and the mold.

According to another feature of the present invention, inclined surfaces are formed along the peripheral edges of opposing surfaces of the two rotary wheels, so that the width of the mold space in cross section decreases in a direction radially toward the axis of the wheels. These inclined surfaces advantageously improve the strength of the cast strip solidified portion against internal pressures of the molten metal and bending forces applied to the cast strip. The inclination angle can be preferably selected from the angle of 5 to 60 degrees.

Figure 2:
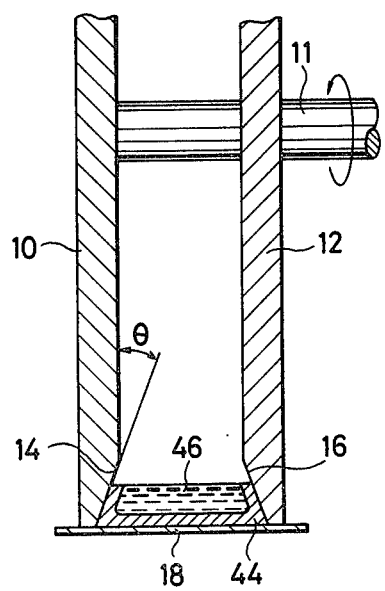
Figure 3:
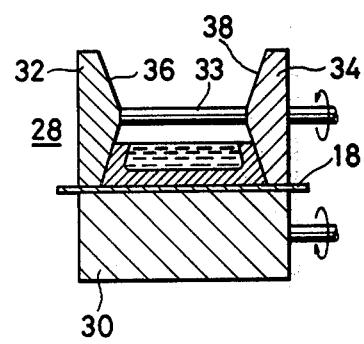
Figure 4:
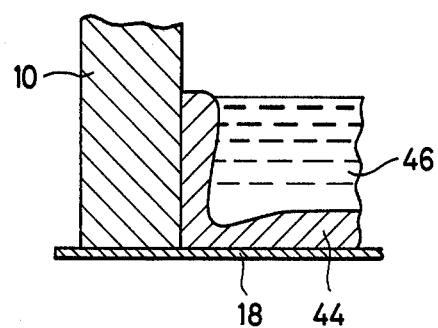
Figure 5:
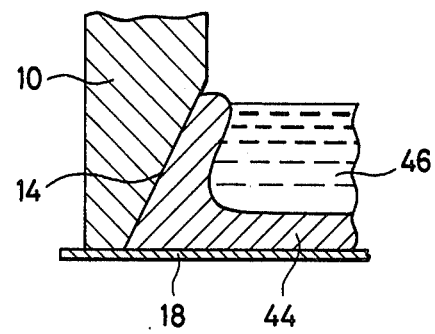
Figure 6:
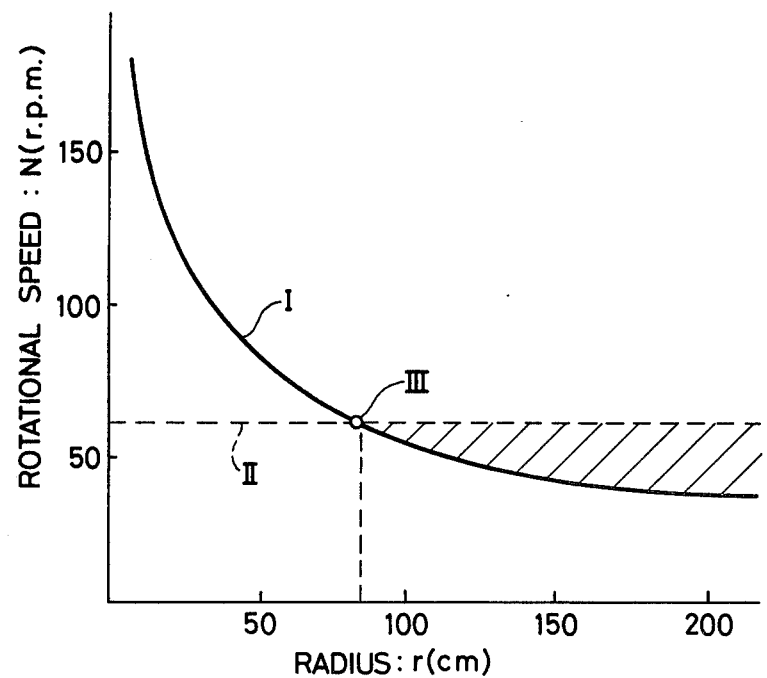
Figure 7:
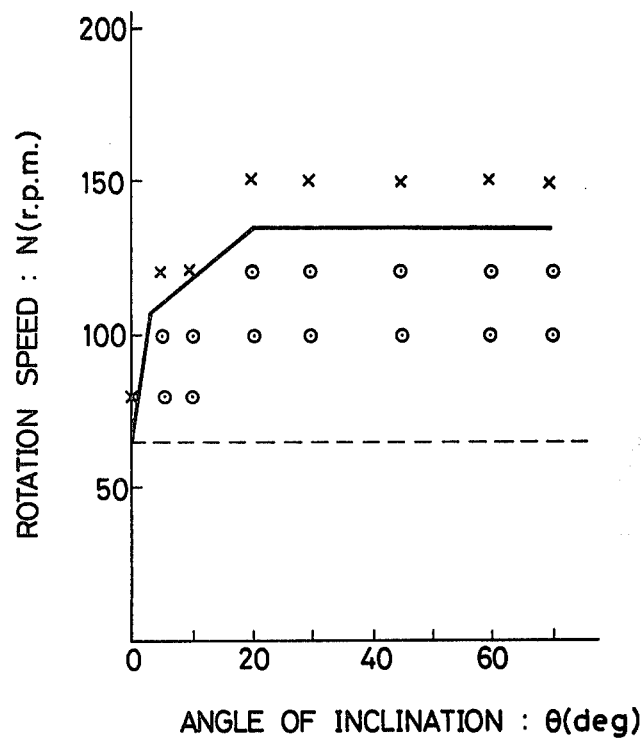

FIG. 1 is a schematic diagrammatic view showing one embodiment of a casting apparatus according to the present invention, FIG. 2 is a cross sectional view taken by a line II—II of FIG. 1, FIG. 3 is a cross sectional view taken by a line III—III of FIG. 1, FIG. 4 is an enlarged cross sectional view of a mold according to a conventional apparatus, FIG. 5 is an enlarged cross sectional view of a mold according to one embodiment of the present invention, FIG. 6 is a graph showing a relationship between the radius of the wheel and the rotational speed of the wheels, FIG. 7 is a graph showing a relationship between the angle of the inclination of the inclined surface and the rotational speed, and FIGS. 8(a) to (d) are respectively cross sectional views of the wheel according to other embodiments of the present invention.

A preferred embodiment of the invention will be described herein after with reference to the accompanying drawings.

Referring first to FIGS. 1 to 3 showing a preferred embodiment of the present invention, a pair of rotary wheels 10, 12 connected by a shaft 11 are arranged coaxially at a predetermined distance from each other. These rotary wheels 10, 12 are adapted to be driven at a high speed in synchronism by means of a drive unit (not shown). Inclined surfaces 14 and 16 having predetermined angle $\theta$ are formed along the peripheral edges of opposing surfaces of these rotary wheels 10 and 12. An endless belt 18 is stretched over the rollers 20, 22, 24 and 26, in such a manner that the belt 18 contacts the outer peripheral surfaces of the rotary wheels 10 and 12 substantially over a half circumference of the rotary wheels 10, 12. The upper surface of the roller 22 is maintained at the same level as the lower faces of the pair of rotary wheels 10, 12 and disposed at a predetermined distance from the latter. A pair of rollers 28, 30 are disposed to clamp therebetween the lower run of the endless belt 18 after leaving the lower peripheral ends of the rotary wheels 10, 12 and before coming into contact with the roller 22. The roller 30 has a cylindrical form as in the case of other rollers 20, 22, 24 and 26. The roller 28 includes a pair of roller parts 32, 34 which are connected by a shaft 33 and disposed coaxially at a predetermined distance from each other, as in the case of the rotary wheels 10, 12. Inclined surfaces 36, 38 of the same angle as the inclined surfaces 14, 16 in the rotary wheels 10, 12 are formed along the peripheral edges of opposing side surfaces of two roller parts 32, 34. Namely, the inclined surfaces 36, 38 in the rollers 32, 34 are inclined at an equal inclination angle $\theta$ or a little larger angle than that of the wheels 10, 12. The distance between the pair of roller parts 32, 34 of the roller 28 is selected to be slightly greater than the distance between the pair of rotary wheels 10, 12. Molten metal 40 is discharged from a nozzle 42. More specifically, this nozzle 42 is so arranged that the molten metal 40 is discharged to the wheel-contacting side of the endless belt 18 contacting the outer peripheral surfaces of the pair of rotary wheels 10, 12. In addition, an arcuate cooling water discharging nozzle assembly 43 is disposed along the non-contacting side of the endless belt 18 which makes contact with the pair of rotary wheels 10, 12 substantially over a half circumference. The peripheral edges of the opposing sides of the pair of rotary wheels 10,12, i.e. the portions for contacting the molten metal, are made of copper, and each of the pair of rotary wheels is adapted to be cooled from the inner side thereof by cooling liquid passages (not shown).

Hereinafter, a description will be made as to how a cast strip is produced by the rotary wheel type continuous casting apparatus having the above described construction.

The molten metal 40 continuously supplied from a molten metal pool (not shown) is discharged upwardly from the nozzle 42. The molten metal is pressed by the centrifugal force into the moving mold formed between the pair of rotary wheels 10, 12 and the endless belt 18 contacting the latter. The pair of rotary wheels 10, 12 are cooled by cooling water circulated therein, while the endless belt 18 is cooled from its outer side by the water discharged from the nozzle assembly 43. In consequence, solidification begins with the portions of the molten metal contacting the endless belt 18 and the opposing peripheral edges (inclined surfaces 14, 16) of the pair of rotary wheels 10, 12, forming a solidification shell 44 as shown in FIG. 2. Thus, there is unsolidified metal 46 in its core portion.

In this state, the unsolidified metal 46 in the cast strip 48 is confined within a solidification shell 44 which are formed in the bottom region adjacent to the endless belt 18 and both side regions adjacent to the rotary wheels 10, 12. This cast strip 48, after leaving the moving mold, is fed into the space between a pair of rolls 28, 30 while being carried by the endless belt 18 which now runs in the horizontal direction. These rolls 28, 30 are provided for separating the cast strip 48 from the moving mould and for straightening the same on a horizontal plane. During the separation and straightening of the cast strip 48, no attaching of unsolidified metal 46 to the roll 28 takes place because the opposing peripheral edges of the roller parts 32, 34 have inclined surfaces 36, 38 substantially corresponding to those of the side walls of the solidification shell of the cast strip 48. The cast strip 48, still holding unsolidified metal 46 therein, is conveyed horizontally by the endless belt 18 past the rolls 28, 30. The solidification shell of the cast strip 48 has a sufficient rigidity or strength to support itself when it arrives at the position on the roll 22. Therefore, the cast strip is never bent, nor does the internal unsolidified metal 46 spill out due to cracking, even when the cast strip 48 is separated from the endless belt 18 and conveyed. By this time, the solidification of unsolidified metal 46 in the solidification sheel 44 has progressed considerably. In the described embodiment, the nozzle 42 is arranged to discharge the molten metal upwardly, in order to fill the moving mold statically at a low pressure. The nozzle can be preferably directed vertically to the surface of the belt. By so doing, it is possible to obtain a cast strip 48 having a uniform thickness and flat surface.

As has been described, the cast strip produced still containing unsolidified metal, is so rigid that the separation from the moving mold and straightening after the separation are conducted without substantial difficulty.

This superior effect of the invention will be described with reference to the drawings. FIG. 4 shows the cross section of the cast strip separated from the moving mold of a continuous casting apparatus in which no inclinations are formed on the opposing peripheral edges of the rotary wheels. It will be seen that the solidification shell 44 containing unsolidified metal 46 has a thickness which is somewhat reduced at the boundary between the bottom and the side wall regions.

In contrast to the above, referring to FIG. 5 showing the cross section of the cast strip formed by the apparatus according to the present invention, the thickness of the solidification shell 44 at the boundary between the bottom and both side wall regions is much greater than that shown in FIG. 4. This is attributable to the different process of cooling from that shown in FIG. 4 due to the cooling at the peripheral edge portions of the rotary wheels 10 and the endless belt 18, as well as to the promotion of of cooling at the corners thanks to the provision of inclinations on the opposing inclined surfaces 14, 16 of the rotary wheels 10, 12.

In the cast strip having a cross section as shown in FIG. 4, cracks tend to be generated at the corners (boundaries between bottom and both side regions) of the solidification shell 44 when the internal pressure is applied by the molten metal due to the centrifugal force, so that the molten metal leaks through the cracks. In this connection, it is to be noted that the cracking and deformation are less liable to occur in the solidification shell 44 shown in FIG. 5, because the corners of the shell have sufficiently large thickness and, hence, a sufficiently large rigidity.

In the case of the solidification shell 44 shown in FIG. 5, the shell acts upon a fulcrum for straightening the cast strip after the separation from the moving mold. Namely, the roller 28 shown in FIG. 3 is pressed down to the cast strip 48 leaving the moving mold, to facilitate the separation and to effect the straightening of the cast strip. In pressing the roller 28 against the cast strip 48, the inclinations of the inclined surfaces 36, 38 of the peripheral edges of the roller parts of the roll 28 press the side walls of the solidification shell 44 from the outside, so that the undesirable attaching of the molten metal to the roll 28 is avoided and the chance of occurrence of the cracking and bending in the solidification shell 44 is very much decreased.

The reduced occurrence of the cracking and bending is attributable to the fact that the side walls of the solidification shell 44 are liable to be turned inwardly in response to the tensile force applied to the upper portion of the case strip 48 during the straightening, so as to relax the tensile force to reduce the strain in the side walls.

In the solidification shell 44 shown in FIG. 4, when the straightening is effected by pressing the cast strip by a roller, the unsolidified metal 46 tends to be splashed and attached to the surface of the roller and the side walls of the solidification shell tend to be distorted.

As has been described, according to the invention, it is possible to withdraw a cast strip still holding molten metal therein, thanks to the provision of the inclinations along the peripheral edges of opposing side surfaces of the pair of rotary wheels 10, 12. The inclination angle is preferably selected taking the operating condition into account. The method of determination of the inclination angle in accordance with the operating condition will be described hereinafter in a quantitative manner.

Representing the radius of rotation by r(cm), angular velocity by $\omega$(rad/sec) and a mass by m(g), the centrifugal force $f_c$ acting on the mass m(g) is given by the following equation.

$$f_c = m r \omega^2 \quad (1)$$

The molten metal receives a force $f_g$ expressed by the following equation (2), due to the gravity.

$$f_g = mg \quad (2)$$

Therefore, the threshold condition for the pressing by the centrifugal force is given as follows.

$$f_c \geq f_g \quad (3)$$

Namely, from the equations (1), (2) and (3), the minimum rotational speed for a given radius of the wheel is derived from the following equation (4).

$$\omega \geq c \cdot \sqrt{g} / \sqrt{r} \quad (4)$$

Also, the minimum radius required for a given rotational speed is expressed as follows.

$$r \geq c^2 \cdot g / \omega^2 \quad (5)$$

The constant c (not smaller than 1) is a safety factor.

The thickness d(cm) of the side wall of the shell in the rotary wheels (moving mold) is expressed in relation to the time $\Delta t$(sec) of stay in the rotary wheels as follows.

$$d = k \sqrt{\Delta t} \quad (6)$$

A test was conducted using water-cooled copper rotary wheels for maximizing the cooling effect. The test result showed that the constant k is approximately 0.3 (cm/sec$^{\frac{1}{2}}$) or 23(mm/min.$^{\frac{1}{2}}$).

In order to ensure a sufficient strength of the solidification shell, it will be necessary to preserve a certain value of $\Delta t$. As will be understood from FIG. 1 the molten metal and the cast strip stays only over a half circumference of the rotary wheels. Therefore, the following relationship is observed between the $\Delta t$ and $\omega$.

$$\omega \Delta t \approx \pi \quad (7)$$

Therefore, the equation (6) can be transformed into the following equation (8).

$$d = k \sqrt{\pi/\omega} \quad (8)$$

From the equation (4) and (8), the following equation (9) is derived.

$$r \geq \frac{c^2 g}{k^4 \pi^2} d^4 \quad (9)$$

The rotational speed N(rpm) is given by the equation (8) as follows.

$$N = 30 k^2 / d^2 \quad (10)$$

The values shown in Table 1 are obtained by substituting in equations (9) and (10) values of c=20, g=980 cm/sec$^2$ and K=0.3 cm/sec$^{\frac{1}{2}}$.

TABLE 1

| d(cm) | r(cm) | N(r.p.m.) |
|---|---|---|
| 0.2 | 78 | 67 |
| 0.3 | 397 | 30 |
| 0.4 | 1255 | 17 |

From Table 1, it will be seen how the reduction of the value d is advantageous. For instance, when it is required to select the value d as d=0.4 cm, it is necessary to make the rotary wheel have a large radius of 12 m which can hardly be realized technically. If the d is selected to be d=0.2 cm, provided that such a thin solidification shell can safely hold the molten metal, the rotary wheels can have a radius which is as small as 0.8 m. In this case, the rotary wheels have to be rotated at a high speed in order to obtain a sufficiently large centrifugal force with such a small radius of rotation. The rotational speed of 67 r.p.m., however, can be realized without substantial technical difficulty.

FIG. 6 shows the relationship between the radius (r) and rotational speed (N). A curve I shows the relationship between r and N as derived from the equation (11) which is obtained through transformation of equation (4).

$$N = (30 C \sqrt{g} / \pi) / \sqrt{r} \quad (11)$$

Namely, in order to obtain a centrifugal force which exceeds the force of gravity, it is necessary to use the right upper part of this curve, i.e. greater value of r or N. A curve II shows the relationship between d and N as obtained from the equation (10). In order to obtain the required thickness of the solidification shell, it is necessary that the number N takes a value below those shown by this curve II. Thus, the practically usable values are those in the hatched area. Since the radius r preferably has a smal value, the point of intersection III is ideal.

Actually, however, the degree of freedom of selection of N is undesirably limited if the value of r corresponding to the point III of intersection is selected. Therefore, practically, the radius r is selected to have a value somewhat greater than that corresponding to the point of intersection. The upper and lower limits are determined through experiments conducted by changing the value of N. By so doing, it is possible to determine the limit or minimum value of the thickness d required for the safe holding of the molten metal along the moving mold.

An experiment was conducted with wheels having radius r=80 cm, aiming at obtaining a cast strip of thickness of 1 cm. From the equation (11), it is derived that the minimum rotational speed is 67 r.p.m. The test castings were conducted at speeds of N=80 to 150 r.p.m. while varying the angle $\theta$ of opposing peripheral surfaces of the rotary wheels as 0°, 5°, 10°, 20°, 30°, 45°, 60°, 70°.

A leak of molten metal due to cracking in the solidification shell attributable to insufficient strength of the wall of solidification shell occurred when the angle was 0. In the cases where the gradients $\theta$ are 5° to 70°, castings were conducted satisfactorily at rotational speeds N less than 100 r.p.m.. Also castings were satisfactory at $\theta$ are 20° to 70° at less than 120 r.p.m.. It will be seen that the greater angle $\theta$ permits a higher casting speed. The limit value of thickness d is changed in relation to the change of the gradient $\theta$, in a manner shown in Table 2.

TABLE 2

| N(rpm) | $\theta$(deg) | | | | | | | |
|---|---|---|---|---|---|---|---|---|
| | 0 | 5 | 10 | 20 | 30 | 45 | 60 | 70 |
| 80 | not good | good | good | — | — | — | — | — |
| 100 | — | good | good | good | good | good | good | good |
| 120 | — | not good | not good | good | good | good | good | good |
| 150 | — | — | — | not good | not good | not good | not good | not good |

From the test results as stated above, it will be seen that the angle $\theta$ is preferably large, although a small angle such as 5° still is effective. An excessively large angle $\theta$, however, makes the corners of the cast strip too keen, so that it is not possible to obtain a uniform cast strip which is to be supplied to the subsequent rolling step. Therefore, the angle $\theta$ preferably does not exceed about 60°.

Figure 8:
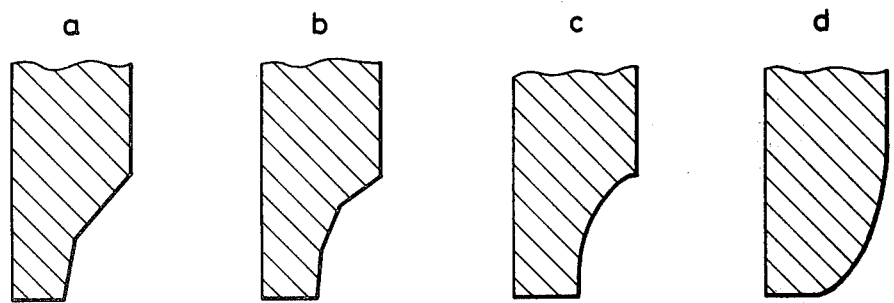

In the embodiment heretofore described, the inclined surfaces formed along the opposing peripheral edges of a pair of rotary wheels are inclined at a predetermined angle $\theta$ to the ends of the endless belt contacting the outer peripheral surfaces of the rotary wheels. An equivalent effect can be obtained when the rotary wheels have inclined surfaces such as in a manner shown in FIGS. 8a to d. Namely, referring to FIGS. 8a and b, each inclined surface has two or three slopes of different angles. In FIGS. 8c and 8d, the inclination is formed to have a curved slope. When the rotary wheels having the inclined surfaces of the forms shown in FIGS. 8c and d are used, the roller parts of the rollers 32 and 34 preferably have slopes of the forms corresponding to those of the rotary wheels.

What we claim is:

1. Continuous casting apparatus for the production of cast metal strip comprising:
    a pair of casting wheels mounted for coaxially rotating around a horizontal axis with a certain distance between respective opposing faces of said wheels;
    an endless metallic belt which is trained semi-annularly around circumferential surfaces of respective wheels and mounted for moving synchronously with said wheels to define a mold space therebetween;
    cooling means for spraying cooling fluid around said belt from a side opposite to said wheels; and
    nozzle means arranged to inject molten metal upwardly into an upper portion of the mold space, thereby the molten metal injected is continuously solidified while radially pressed against the bottom of the mold space by centrifugal force and withdrawn from the mold space as a cast metal strip with the rotational movement of said wheels and belt.

2. A continuous casting apparatus according to claim 1, wherein said nozzle means is located between the opposing faces of said wheels.

3. Continuous casting apparatus according to claim 1 or 2, wherein the cast metal strip is withdrawn horizontally away from the mold space at the bottom of said wheels.

4. Continuous casting apparatus according to claim 3, further comprising roller means located along a passage of the cast metal strip withdrawn from the mold space for straightening the cast metal strip.

5. Continuous casting apparatus according to claim 3, wherein the opposing faces of said wheels have inclined surfaces such that the width of the cross section of the mold space becomes narrower in the direction toward the axis of said wheels.

6. Continuous casting apparatus according to claim 5, wherein the inclination angle of the inclined surfaces is 5 to 60 degrees.

7. Continuous casting apparatus according to claim 6, wherein the inclined surfaces are formed of curved surfaces.

8. Continuous casting apparatus according to claim 5, further including roller means located along a passage of the cast metal strip withdrawn from the mold space for straightening the cast metal strip.

9. Continuous casting apparatus according to claim 8, wherein said roller means comprises an upper roller directly contacting side surfaces of the cast metal strip and a lower roller supporting the cast metal strip below said upper roller through said belt.

10. Continuous casting apparatus according to claim 9, wherein said upper roller has inclined surfaces respectively contacting the side surfaces of the cast metal strip.

11. Continuous casting apparatus according to claim 10, wherein the inclined surfaces of said upper roller has the same inclination angle as that of said wheels.

12. A continuous casting apparatus for the production of cast metal strip, comprising:
    endless opposed side walls and an endless bottom wall mounted for synchronous movement in respective endless paths including a common arcuate mold path portion within a vertical plane, all of said walls forming a radially inwardly open channel shaped traveling arcuate mold space in said mold path portion having an entrance end at the top and an exit end at the bottom;
    nozzle means arranged to inject molten metal upwardly into said mold space at said entrance end and means for withdrawing an at least partially solidified metal strip from said exit end so that the molten metal injected is continuously solidified while radially pressed against the bottom of the mold space by centrifugal force and withdrawn from the mold space as a cast metal strip with the movement of said walls; and means for cooling said walls to solidify the molten metal adjacent said walls to form a corresponding shaped solidified cast metal strip of increasing wall thickness toward said exit with molten metal therein.

13. Continuous casting apparatus according to claim 12, wherein each of said side walls forms a converging angle, with respect to a line perpendicular to said bottom wall, within the range of 5 to 60 degrees.

14. Continuous casting apparatus according to claim 13, wherein said bottom wall is formed by an endless belt, and said side walls are formed by a cylindrical wheel.

15. Continuous casting apparatus according to claim 12, wherein, within said mold path portion, said side walls converge toward each other away from said bottom wall to provide for increased cooling and solidification of the channel shaped cast piece in the vicinity of the junction between said side walls and bottom wall.

16. Continuous casting apparatus according to claim 12, wherein said common mold path portion and correspondingly said mold space is semicircular with a fixed horizontal axis of rotation, and wherein said means for withdrawing withdraws said metal strip tangentially with respect to said axis in the horizontal direction.

17. Continuous casting apparatus according to claim 1, wherein said belt circumferentially engages said wheels through an arc of at least about 180°; said mold space being channel shaped and open radially inward.

18. Continuous casting apparatus according to claim 17, wherein said endless metallic belt has a return run portion on the same side of said wheels as and radially outward of its portion that defines said mold space.

19. Continuous casting apparatus according to claim 18, wherein said cooling means is within the endless path of said belt; said nozzle means is between said wheels.

20. Continuous casting apparatus according to claim 19, wherein said endless belt includes a withdrawn metal strip support portion extending tangentially and horizontally from said wheels for a substantial distance in engagement with the withdrawn cast metal strip.

21. Continuous casting apparatus according to claim 20, further including roller means located along a passage of the cast metal strip withdrawn from the mold space for straightening the cast metal strip while it is still supported by said belt.

22. Continuous casting apparatus according to claim 18, wherein said endless belt includes a withdrawn metal strip support portion extending tangentially and horizontally from said wheels for a substantial distance in engagement with the withdrawn cast metal strip.

23. Continuous casting apparatus according to claim 22, further including roller means located along a passage of the cast metal strip withdrawn from the mold space for straightening the cast metal strip while it is still supported by said belt.

* * * * *